US012643159B2

(12) United States Patent

Harnett

(10) Patent No.: US 12,643,159 B2
(45) Date of Patent: Jun. 2, 2026

(54) SUPPORT DEVICE

(71) Applicant: PLUMBINGENUITY LIMITED,
London (GB)

(72) Inventor: Tyrone Harnett, London (GB)

(73) Assignee: PLUMBINGENUITY LIMITED,
London (GB)

( * ) Notice: Subject to any disclaimer, the term of this
patent is extended or adjusted under 35
U.S.C. 154(b) by 578 days.

(21) Appl. No.: 18/044,147

(22) PCT Filed: Sep. 7, 2021

(86) PCT No.: PCT/GB2021/052296

§ 371 (c)(1),
(2) Date: Mar. 6, 2023

(87) PCT Pub. No.: WO2022/053790

PCT Pub. Date: Mar. 17, 2022

(65) Prior Publication Data

US 2023/0330756 A1    Oct. 19, 2023

(30) Foreign Application Priority Data

Sep. 8, 2020    (GB) ..................................... 2014101

(51) Int. Cl.
*B23B 49/02*        (2006.01)
*B23Q 11/00*        (2006.01)
(52) U.S. Cl.
CPC ........ *B23B 49/026* (2013.01); *B23Q 11/0046*
(2013.01); *B23B 2260/118* (2013.01)

(58) Field of Classification Search
CPC ............ B23B 49/026; B23B 2260/118; B23Q
11/0046
See application file for complete search history.

(56) References Cited

U.S. PATENT DOCUMENTS

| | | | | |
|---|---|---|---|---|
| 2,879,035 | A | 3/1959 | Tilden | |
| 9,802,331 | B1 * | 10/2017 | Hall, Jr. ................... | B23C 9/00 |
| 12,194,547 | B2 * | 1/2025 | Holzmeier ......... | B23Q 11/0046 |
| 2009/0172911 | A1 | 7/2009 | Miyanaga | |
| 2009/0181606 | A1 | 7/2009 | Loveless et al. | |

(Continued)

FOREIGN PATENT DOCUMENTS

| | | |
|---|---|---|
| CN | 206066060 U | 4/2017 |
| DE | 202006005365 U1 | 6/2006 |

(Continued)

OTHER PUBLICATIONS

International Search Report issued by ISA/EP in connection with
PCT/GB2021/052296 dated Mar. 17, 2022.

(Continued)

*Primary Examiner* — Eric A. Gates
(74) *Attorney, Agent, or Firm* — Levenfeld Pearlstein,
LLC

(57) ABSTRACT

A support device (10) is illustrated comprising a body (14)
defining a recess (22*a*) in its underside, a connector (24) to
which a vacuum device can be connected, the connector (24)
and recess (22*a*) communicating with one another so that the
vacuum device can extract air from the recess (22*a*), the
body (14) further defining a passage (22*b*, 26) through which
a drill bit (12) can extend, in use, at least part of the
periphery of the passage (22*b*, 26) serving to support the
drill bit (12), in use.

10 Claims, 4 Drawing Sheets

(56)    References Cited

U.S. PATENT DOCUMENTS

2017/0246696 A1      8/2017  He
2020/0232444 A1 *    7/2020  Irissappane ............. F03D 80/30

FOREIGN PATENT DOCUMENTS

DE        102006018976 B3    11/2007
FR              2868974 A1    10/2005
GB              2483645 A  *   3/2012   ......... B23Q 11/1092
WO          2016156840 A1    10/2016

OTHER PUBLICATIONS

Written Opinion issued by ISA/EP in connection with PCT/GB2021/052296 dated Mar. 17, 2022.
International Preliminary Report on Patentability issued by WIPO in connection with PCT/GB2021/052296 dated Mar. 13, 2023.

* cited by examiner

SUPPORT DEVICE

CROSS-REFERENCE TO RELATED APPLICATION DATA

This application is a 35 U.S.C. 371 U.S. national stage filing of International Application No. PCT/GB2021/052296, having an international filing date of Sep. 7, 2021, titled SUPPORT DEVICE, which claims the benefit of and priority to Great Britain application GB2014101.6, filed Sep. 8, 2020, titled SUPPORT DEVICE, the disclosures of which are incorporated herein in their entireties.

This invention relates to a support device, and in particular to a support device to assist a user when using a core drill bit or the like.

Core drill bits are in common use when it is required to form a large diameter hole through a wall or the like. A core drill bit comprises a hollow cylindrical body adapted to be fitted to the chuck of a power drill or the like. The end of the body remote from the power drill is shaped to define a series of cutting teeth. In use, with the toothed end of the core drill bit in engagement with a wall, and with the power drill operating, it will be appreciated that an annular groove can be cut into the wall and that, once the groove is of a sufficient depth that it extends all of the way through the wall, the "core" defined by the annular groove can be removed leaving a relatively large dimension opening in the wall. The core will typically be contained within the drill bit and require removal therefrom after completion of the drilling process once the drill bit has been removed from the opening.

Ensuring that the core drill bit is correctly positioned, especially during the initial phases in the operation for forming the opening, can be difficult as the drill bit is large and awkward to hold in a desired position. In order to address this, it is usual for a short pilot hole to be drilled into the wall at the location of the centre of the required opening, and for a guide member to be fitted within the core drill bit which can be located within the pilot hole and serve to guide and support the core drill bit during the initial part of the process of cutting the annular groove in the wall using the core drill bit. Subsequently, once the annular groove is of a depth of, for example, around 10 mm, the core drill bit is retracted from the groove, the guide member is removed from the core drill bit, typically using a drift tool, and the core drill bit is reintroduced into the annular groove in the wall to allow drilling to continue. By this point in the process, the drill bit is supported and guided by the parts of the annular groove that have already been formed, and so the guide member is no longer required. Indeed, removal of the guide member is typically essential as the pilot hole is often of insufficient depth to extend all of the way through the wall, and so its presence would limit the depth of the annular groove that can be cut using the core drill bit, and so would prevent the formation of a hole passing all of the way through the wall.

It will be appreciated that the operation of using a drill to form a pilot hole, fitting the guide member to the core drill bit, performing an initial core drilling operation to form an annular groove in the wall, removing the core drill bit from the annular groove, removing the guide member from the core drill bit and then reintroducing the core drill bit into the annular groove to allow drilling to continue results in the drilling operation being relatively complex and time consuming. It is an object of the invention to provide an arrangement by which the drilling operation can be simplified, and thereby overcome or reduce some of the disadvantages associated with conventional drilling operations.

According to the present invention there is provided a support device comprising a body defining a recess in its underside, a connector to which a vacuum device can be connected, the connector and recess communicating with one another so that the vacuum device can extract air from the recess, the body further defining a passage through which a drill bit can extend, in use, at least part of the periphery of the passage serving to support the drill bit, in use.

It will be appreciated that, in use, the support device may be positioned upon a wall in the location at which an opening is to be formed, and by operation of the vacuum device may be retained in position to provide support for a drill bit introduced through the opening. In this manner, a number of steps in the drilling procedure outlined hereinbefore may be avoided. Specifically, the need to form a pilot hole, fit a guide member to the core drill bit, and to subsequently interrupt the drilling operation to allow removal of the guide member can all be avoided. As a consequence, the procedure for forming the opening can be very much simplified and the time taken to form the opening can be reduced.

Preferably, the passage is closed, in part, by a cover member moveably mounted upon the body. In this manner, by adjusting the position of the cover member, the size of the exposed opening to the passage may be adjusted to suit the drill bit with which the invention is being used. Whilst the invention is especially suitable for use with core drill bits, it will be appreciated that it may be used with other forms of drill bit, if desired.

The passage and the recess conveniently communicate with one another. As a result, dust produced during the drilling operation may be extracted from the passage into the recess and from there through the connector to the vacuum device. The support device is thus further advantageous in that the use of the invention may allow openings to be formed whilst causing less dirt to accumulate in the area in which works are being undertaken.

Conveniently, the passage and the recess are separated from one another by a partition in which a plurality of notches are formed, the notches preferably being located in an edge of the partition that, in use, faces towards the wall in which the opening is being formed. The partition may be of generally V-shaped form. One of the notches is preferably located adjacent the apex of the generally V-shaped partition, and others of the notches are preferably located close to ends of the partition. Such an arrangement is advantageous in that dust particles will tend to be guided towards the notches, and so extraction of dust from the support is enhanced.

The invention will further be described, by way of example, with reference to the accompanying drawings, in which.

Figure 1:
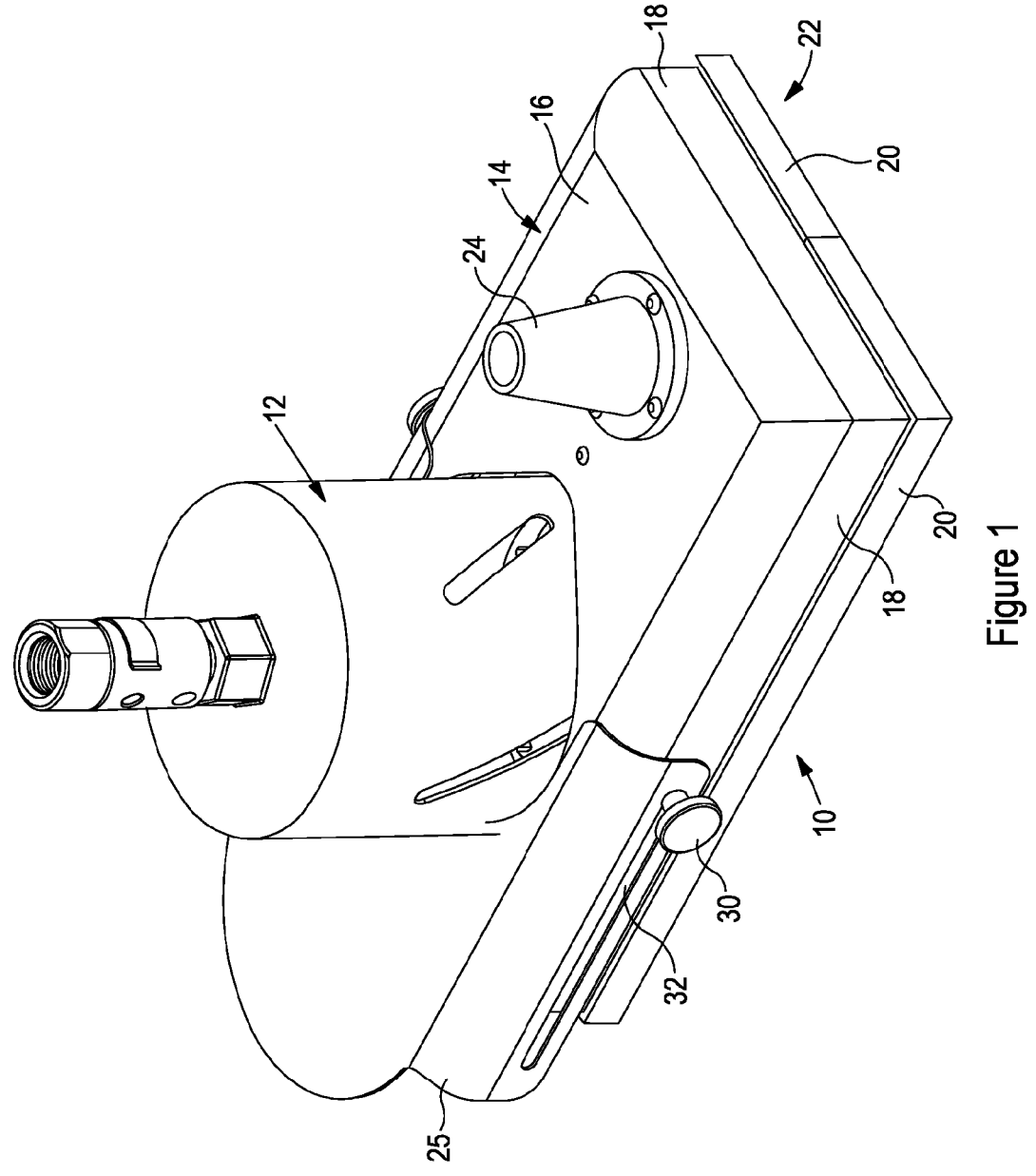
FIG. 1 is a perspective view of a support in accordance with an embodiment of the invention, in use.

Referring to the accompanying drawings, a support 10 is illustrated for use with a core drill bit 12 (or other form of drill bit) to assist in supporting and guiding the drill bit 12 and so assist the formation of holes in walls. The support 10 comprises a body 14 of generally rectangular shape, defined by an upper wall 16 and side walls 18. The side walls 18 carry, along their free edges, rubber-like material seal members 20. In use, the support 10 is positioned against a wall in which an opening is to be formed with the seal members 20 bearing against the wall, and it will be appreciated that the body 14 and wall together define a void 22.

A connector member 24 of hollow, frusto-conical shape is mounted upon the body 14 and communicates through an opening formed in the upper wall 16 with a part 22a of the void 22. In use, the hose from a vacuum cleaner or the like is pushed onto the connector member 24, and it will be appreciated that with the vacuum cleaner or the like switched on, air is drawn from the part 22a, lowering the air pressure therein, and that as a result the body 14 is retained in position upon the wall by the suction effect arising from the operation of the vacuum cleaner or the like.

The upper wall 16 is formed with an opening 26 through which the drill bit 12 extends, in use. As can be seen in the drawings, the opening 26 is of generally tear drop shaped form, including a section 26a of generally circular shape, and a section 26b defined by generally tangentially extending walls 26c, interconnected by a curved part 26d of a smaller radius of curvature. Slidably secured to the body 14 is a cover member 28, the cover member 28 being secured in position by threaded bolts 30 extending through slots 32 formed in the cover member 28, holes 34 formed in the body 14 and engaging with corresponding nuts 36. The bolts 30 are conveniently of knurled form and so are readily adjusted by hand without requiring the use of tools to tighten or loosen them. The cover member 28 is shaped to define a generally V-shaped notch 38.

In use, with the drill bit 12 extending through the opening 26, typically bearing against the walls 26c and/or the curved part 26d, the cover member 28 can be positioned so as to close at least a part of the opening 26 not occupied by the drill bit 12. It will be appreciated that the body 14 and cover member 28 will not form a perfect seal with the drill bit 12, and depending upon the dimensions of the drill bit 12 in use, there will usually be parts of the opening 26 that are not covered by the cover member 28 and are not occupied by the drill bit 12, but that the exposed area of the opening 26 through which dust can escape, in use, is relatively small. Consequently, dust generated, in use, through the operation of the drill bit 12 is largely contained within the body 14.

Figure 2:
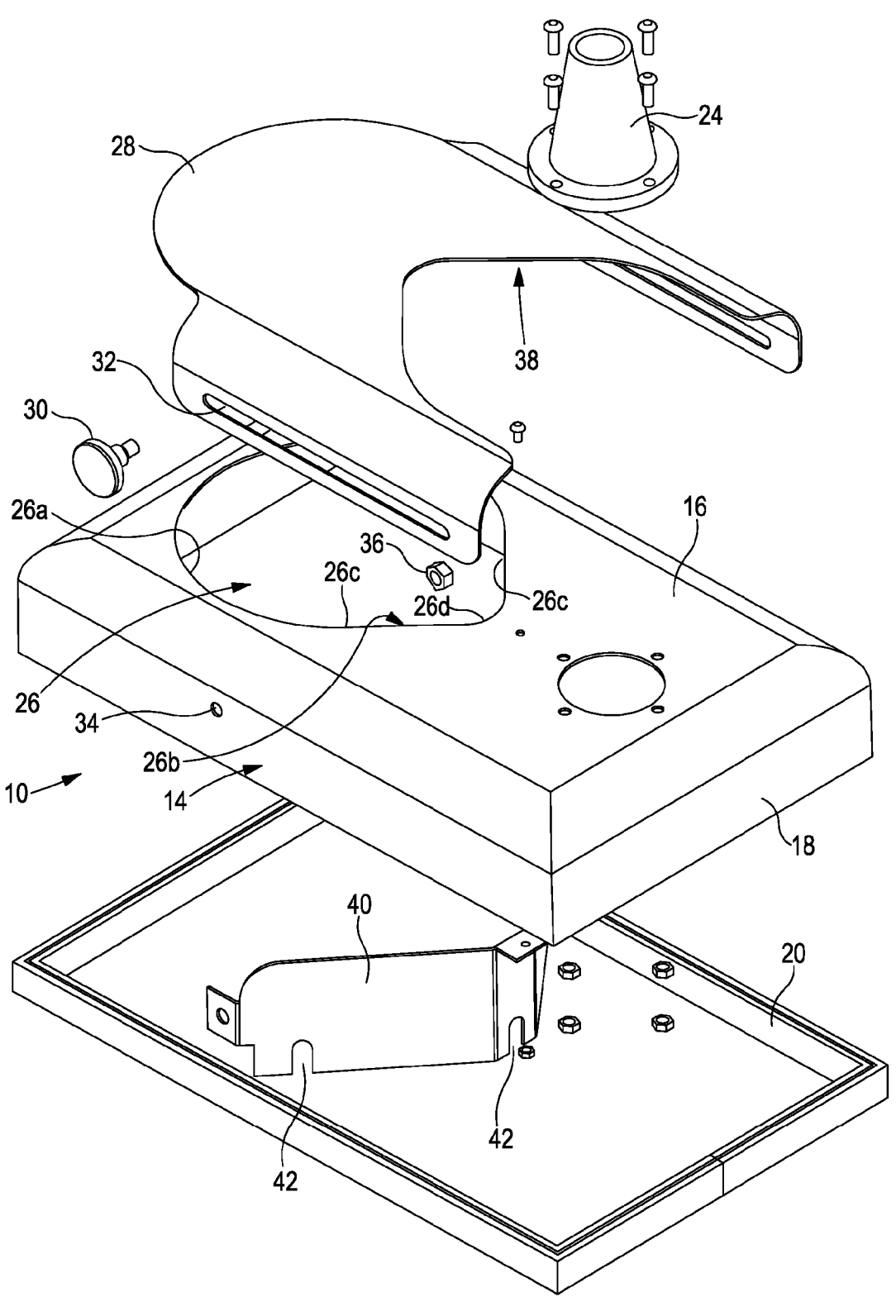
FIG. 2 is an exploded view illustrating parts of the support.
Figure 3:
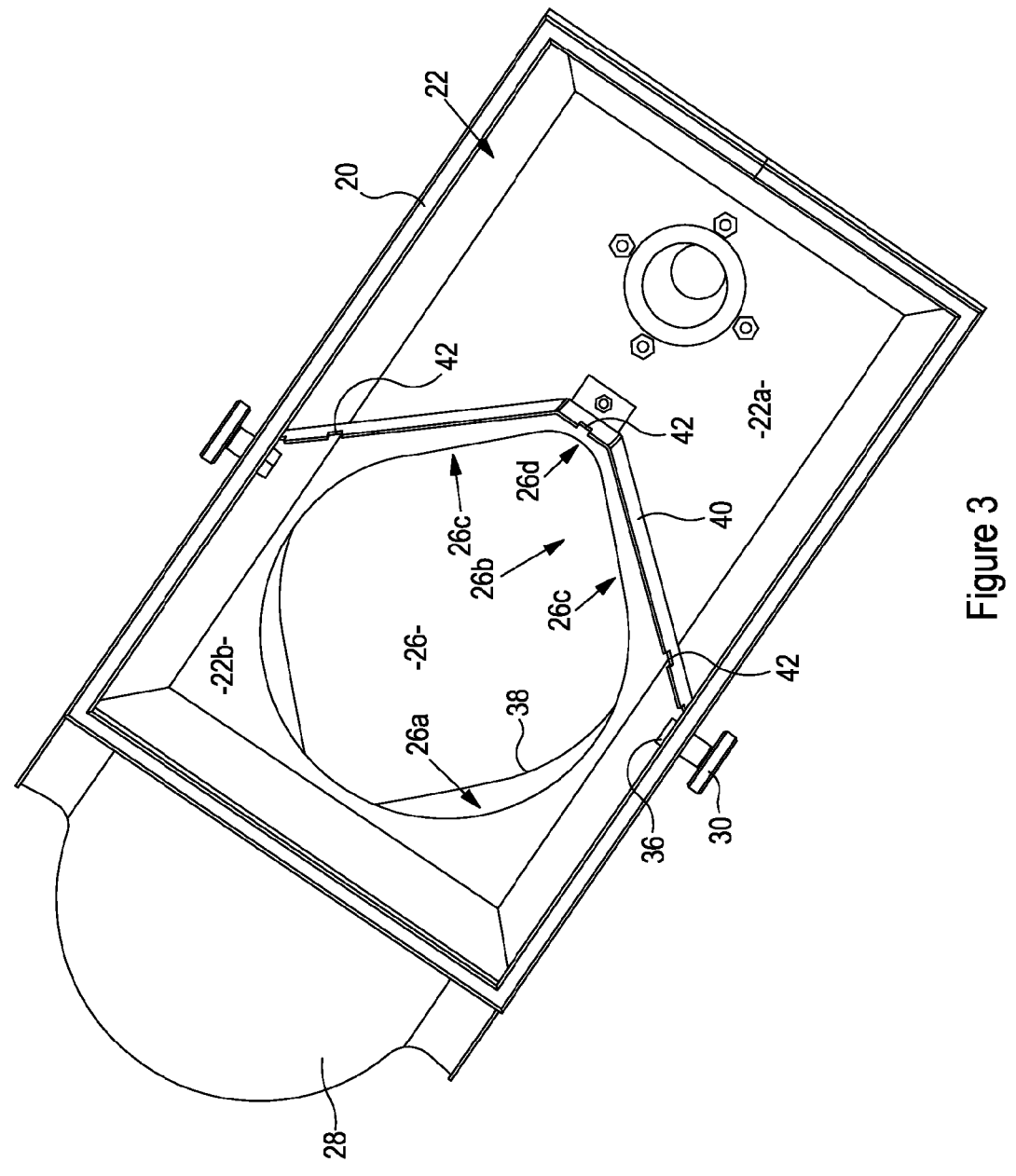
FIGS. 3 and 4 are views of the underside of the support, with part of the support in two different operating positions.
Figure 4:
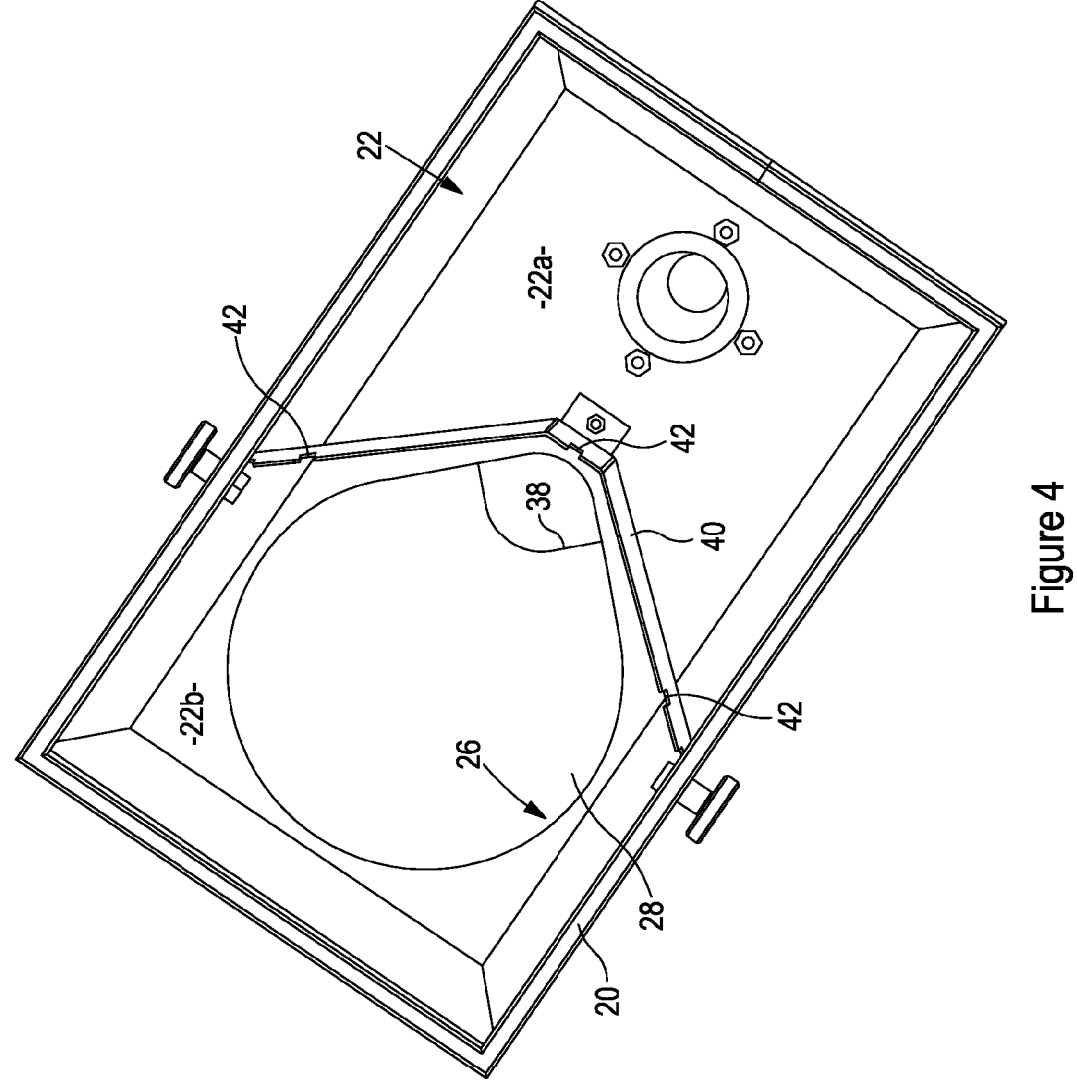

As shown in FIGS. 2, 3 and 4, the void 22 is divided into the aforementioned 22a and a second part 22b by a partition wall 40 that, in this embodiment, is of generally V-shaped form. The part 22a of the void 22 communicates with the connector member 24, and so defines a recess that, in use, is at a reduced air pressure and serves as a suction chamber by which the support 10 is held in position in a desired location upon a wall. The part 22b has the opening 26 communicating therewith and, together with the opening 26, defines a passage through the body 14 through which the drill bit 12 extends, in use, and by which the drill bit 12 is supported. In use, dust formed during drilling will tend to collect within the part 22b. As illustrated, the partition wall 40 defines, in its edge that faces towards the wall, in use, a plurality of notches 42 defining flow passages through which such dust can be sucked, by the operation of the vacuum cleaner or the like, from the part 22b to the part 22a, and from there through the connector member 24 to the vacuum cleaner or the like. If the support 10 is used in an orientation in which the connector member 24 is directly beneath the opening 26, then it will be appreciated that dust will tend to fall, under the action of gravity, towards the lowermost part of the generally V-shaped partition wall 40, and will tend to flow through the notch 42 positioned at that location to the part

4

22a. If used in an orientation approaching perpendicular to that described above, then dust will tend to collect towards one or other side of the part 22b and flow through one or other of the notches 42 located close to the side walls 18. The shapes and positions of the notches 42, and the fact that they comprise notches rather than fully enclosed openings, means that extraction of dust can be enhanced, and that the risk of blockage is reduced, and that clearing of any blockages is simplified.

In use, therefore, the support 10 is held, by the suction effect arising from the operation of the vacuum device or the like reducing the air pressure within the suction chamber, against a wall at a location at which an opening is to be formed. The drill bit 12 is introduced into and through the passage defined by the opening 26 and the part 22b of the void 22, and the position of the cover member 28 is adjusted to obstruct as much of the opening 26 as possible. FIG. 3 shows the cover member 28 in a position in which the opening 26 is largely unobstructed, for use with a relatively large diameter drill bit, and FIG. 4 illustrates the case where a smaller drill bit is used and the opening 26 is largely obstructed by the cover member 28. The cover plate 28 can be located at any intermediate position between the extremes shown in these drawings. The power drill or the like to which the drill bit 12 is fitted is then operated to cause rotation of the drill bit 12 and the formation of the required hole. The drill bit 12 is supported and guided by the support 10, bearing against parts of the walls defining the opening 26 and the notch 38, and ensuring that the hole is formed in the required location, without requiring the formation of a pilot guide and the use of a guide member fitted to the drill bit, and so the drilling operation is simplified. In addition, dust generated during the drilling operation can be extracted and collected by the vacuum cleaner device, the vacuum cleaner device serving the dual purpose of maintaining a sufficient level of suction to hold the support 10 in position and the extraction of dust.

Whilst in the arrangement illustrated, the partition wall 40 is of generally V-shaped form, it could be of other shapes, if desired. By way of example, it may be shaped such that the part 22a extends along substantially the full length of the body 14 around the sides of the opening 26, and this may be advantageous in that the support 10 may be more firmly secured in position upon the wall by the suction effect provided by the vacuum cleaner device, in use.

It is envisaged that the body 14 and cover member 28 will be of sheet metal form, so as to readily withstand harsh treatment and wear and tear, for example arising from engagement between parts of the support 10 and the drill bit 12, in use. However, other materials may be used, if desired. Furthermore, the support 10 need not be of the precise shape shown.

Although a specific embodiment of the support 10 is described herein with reference to the accompanying drawings, it will be appreciated that a wide range of modifications and alterations may be made thereto without departing from the scope of the invention as defined by the appended claims.

The invention claimed is:

1. A support device comprising a body defining a recess in its underside, a connector to which a vacuum device can be connected, the connector and recess communicating with one another so that the vacuum device can extract air from the recess, the body further defining a passage through which a drill bit can extend, in use, at least part of the periphery of the passage serving to support the drill bit, in use, wherein the device further comprises a cover member moveably mounted upon the body, wherein the passage is provided by an opening in the body and by a generally V-shaped notch in the cover member, wherein the cover member can be positioned so as to close the passage, at least in part, so as to allow it to largely obstruct the opening when positioned for use with a smaller drill bit.

2. The device according to claim 1, wherein the passage and the recess communicate with one another.

3. The device according to claim 1, wherein the passage and the recess are separated from one another by a partition.

4. The device according to claim 3, wherein a plurality of notches are formed in the partition.

5. The device according to claim 4, wherein the notches are located in an edge of the partition that, in use, faces towards a wall in which an opening is being formed.

6. The device according to claim 3, wherein the partition is of generally V-shaped form.

7. The device according to claim 6, wherein a plurality of notches are formed in the partition, and wherein one of the notches is located adjacent the apex of the generally V-shaped partition.

8. The device according to claim 7, wherein others of the notches are located close to ends of the partition.

9. The device according to claim 1, wherein the cover member is shaped to define a generally V-shaped notch.

10. The device according to claim 1, wherein the opening is of generally tear-drop shaped form, including a section of generally circular shape, and a section defined by generally tangentially extending walls, interconnected by a curved part of a smaller radius of curvature.

* * * * *